June 9, 1925.
H. P. DOOLITTLE
HYDROCARBON MOTOR
Filed March 13, 1920
1,540,981
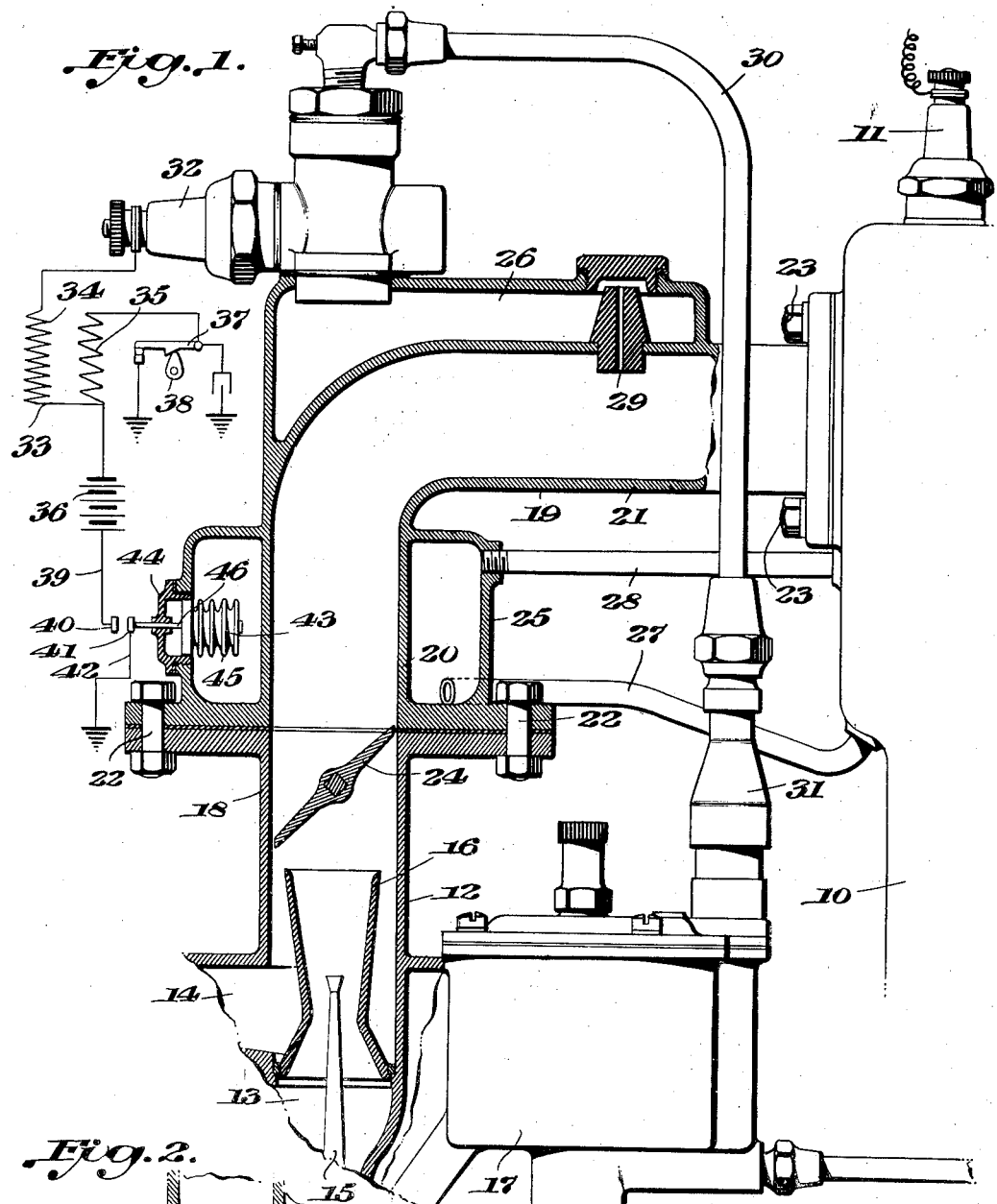
Inventor,
Henry P. Doolittle,
By Milton Tibbetts,
Atty.

Patented June 9, 1925.

1,540,981

UNITED STATES PATENT OFFICE.

HENRY P. DOOLITTLE, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed March 13, 1920. Serial No. 365,450.

*To all whom it may concern:*

Be it known that I, HENRY P. DOOLITTLE, a citizen of the United States, and resident of Detroit, Wayne County, State of Michigan, have invented certain new and useful Improvements in Hydrocarbon Motors, of which the following is a specification.

This invention relates to hydrocarbon motors, and particularly to the mixture heating means therefor.

The salient object of the present invention is to provide means for automatically controlling the operation of the mixture heating means.

With the lower grades of fuel used today in hydrocarbon motors, various means for heating the fuel have been devised. One of these devices is a combustion heater, which so heats the fuel, particularly on nearly closed throttle, that the less volatile parts of it become vaporized and formed into a dry gas. This is particularly desirable when the motor is cold, as when starting, and even when the motor is idling, because in that case the motor is not warm enough to itself supply the heat required for vaporization of the liquid fuel. But it is found that in some cases it is desirable to cut out the heater when the temperature of the motor has reached a rather high point, because at that time the motor itself will supply sufficient heat to effect vaporization to the degree necessary for complete combustion.

Thus the present invention contemplates the use of an extraneous heater for supplying heat to the fuel when the motor itself is not operating hot enough to properly vaporize the fuel, but when the motor itself is operating to supply sufficient heat for vaporizing, the extraneous heating means is automatically put out of action.

Other objects and advantages of the invention will appear from the following description taken in connection with the drawings, which form a part of this specification, and in which—

Figure 1 is a part elevation and part sectional view of a hydrocarbon motor embodying the invention; and Figure 2 is a detail sectional view of the thermostat unit.

Referring to the drawings, 10 represents a cylinder or cylinder block of a hydrocarbon motor, one of the spark plugs 11 being shown at the upper end of the cylinder. 12 is a carburetor for supply a suitable mixture to the motor, said carburetor comprising air inlets 13 and 14, a gasoline nozzle 15 arranged in a Venturi air tube 16, and a float chamber 17 arranged to supply the nozzle 15 at the desired level.

The upper part of the carburetor 12 is in the form of a conduit 18 which connects through a conduit 19 with the motor so that the mixture from the carburetor passes through the intake conduit 19 and enters the motor through the intake valves thereof.

The conduit 19 is shown in the form of an elbow having arms 20 and 21, the arm 20 being connected to the carburetor as by a series of bolts 22, and the arm 21 being connected to the cylinder block as by bolts 23.

The quantity of mixture passing to the motor is controlled by a throttle valve 24 which may be arranged at any suitable point in the conduit between the carburetor and the motor, but as shown it is in the conduit 18 above referred to.

The intake conduit 19 is jacketed on both of its arms, a water jacket 25 surrounding the arm 20, and a jacket or combustion chamber 26 surrounding a part of the arm 21. The water jacket 25 is supplied with water from the motor cylinders as by the pipes 27 and 28 so that the water in the jacket 25 will correspond in temperature to that of the cylinder jackets.

The jacket or combustion chamber 26 has an outlet 29 into the intake conduit of the motor above the throttle valve 24 so that the chamber is subject to the suction of the motor. Of course this suction is greater when the throttle valve is closed, or partly closed, than it is when the valve is wide open, and this suction draws into the combustion chamber a mixture of gasoline and air suitable for igniting therein. This mixture comes through a pipe 30 from a small carburetor 31 mounted upon the float chamber 17 of the carburetor 12 above referred to. The auxiliary carburetor 31 may be of any suitable construction which will adapt it to supply a mixture to the combustion chamber 26. In that chamber the mixture is ignited by a spark plug 32 operated by suitable electrical means, such as that diagrammatically illustrated in the drawing. That means comprises a coil 33 having a secondary 34 connected to the spark plug 32 and a primary 35 connected to a battery 36 and to a contact maker 37 which is actuated by a cam 38 connected to any suitable rotating part of the motor. The opposite side of the battery 36 is connected through a conductor 39 and contacts 40 and 41 with ground at 42.

From the above it will be seen that as the motor is started mixture will be supplied to it through the intake conduit 19 and mixture will be supplied from the auxiliary carburetor 31 to the combustion chamber 26 where it will be ignited by the spark plug 32. The burnt gas from this mixture, in addition to heating the arm 21 of the conduit 19 through the walls of the latter, will pass directly into the conduit 19 through the opening 29 so that it will thereby come in direct contact with the incoming gases and heat them to such a degree that they are practically in the form of a dry gas when they enter the cylinders.

For the purpose of controlling the combustion heater so that when the motor reaches a predetermined heat the spark plug for the heater may be cut off, a thermostat 43 is provided in the water jacket 25, and when the said jacket is connected with the jacket of the motor, the water therein is at substantially the same temperature as that of the motor water jacket.

The thermostat 43 is in the form of a unit having a cap 44 which may be threaded into an opening in the wall of the jacket 25 and a compressible cylinder 45 secured to the cap. The compressible part of the thermostat unit is connected by a rod 46 to the contact 41 above referred to so that the expansion of the thermostat by the heat of the water surrounding it will break the connection between the contacts 40 and 41, as shown in Figure 2. This will cause a stoppage of the current passing to the spark plug 32, thereby cutting out the operation of the combustion heater.

As soon as the temperature of the water in the jacket 25 is sufficiently reduced, the thermostat 43 will operate to close the contacts 40 and 41, which will thereby immediately start the combustion heater in operation again.

A specific embodiment of the invention has been described in detail and will be specifically claimed, but it will be understood that the invention is not limited to the exact details of construction shown, as it will be apparent that changes may be made without departing from the spirit or scope of the invention.

Having thus described my invention, what I claim and desire to secure by Letters Patent is:

1. In a hydrocarbon motor, the combination with a water jacketed intake conduit, of a combustion heater for the intake gases, and means depending upon the temperature of the jacket water for controlling the operation of the combustion heater.

2. In a hydrocarbon motor, the combination with a water jacketed intake conduit, of a combustion heater for the intake gases, and a thermostat arranged in the water jacket for controlling the operation of the combustion heater.

3. In a hydrocarbon motor, the combination with an intake conduit having a water jacket connected with the water jacket of the motor, of a combustion heater for the intake gases arranged to discharge into the intake conduit beyond the water jacket thereof, and means depending upon the temperature of the water in the jacket of said intake conduit for controlling the operation of the combustion heater.

In testimony whereof I affix my signature.

HENRY P. DOOLITTLE.